US006358053B1

(12) United States Patent
Rosenfield et al.

(10) Patent No.: US 6,358,053 B1
(45) Date of Patent: Mar. 19, 2002

(54) INTERACTIVE ONLINE LANGUAGE INSTRUCTION

(75) Inventors: Andrew M. Rosenfield, Lake Forest; Edwin Eisendrath, Chicago, both of IL (US); Brian M. Freeman, Short Hills, NJ (US); Maximilian A. Grant, Chicago, IL (US); Enio Ohmaye, Highland Park, IL (US); Patrick Keating, Highland Park, IL (US)

(73) Assignee: UNext.com LLC, Deerfield, IL (US)

( * ) Notice: Subject to any disclaimer, the term of this patent is extended or adjusted under 35 U.S.C. 154(b) by 0 days.

(21) Appl. No.: 09/510,042

(22) Filed: Feb. 22, 2000

Related U.S. Application Data

(63) Continuation-in-part of application No. 09/344,732, filed on Jun. 25, 1999.
(60) Provisional application No. 60/116,120, filed on Jan. 15, 1999.

(51) Int. Cl.[7] .......... G09B 19/00
(52) U.S. Cl. .......... 434/156; 434/157; 434/350; 704/8
(58) Field of Search .......... 434/156, 157, 434/350, 118; 704/8

(56) References Cited

U.S. PATENT DOCUMENTS 4,238,893 A * 12/1980 Komatsubara et al. .. 434/351 X
4,786,255 A * 11/1988 Hiramatsu et al. .......... 434/157
5,273,433 A * 12/1993 Kaminski et al. ....... 434/169 X
5,885,083 A * 3/1999 Ferrell .................... 434/156 X
6,021,119 A * 1/2000 Derks et al. ............ 370/261 X
6,141,528 A * 10/2000 Remschel ............... 434/350 X
6,149,441 A * 11/2000 Pelligrino et al. ...... 434/350 X
6,196,846 B1 * 3/2001 Berger et al. ............... 434/118

* cited by examiner

*Primary Examiner*—Valencia Martin-Wallace
*Assistant Examiner*—Chanda Harris
(74) *Attorney, Agent, or Firm*—Joseph Levi, Esq.; Joseph P. Kincart, E; Clifford Chance Roge & Wells LLP

(57) ABSTRACT

A computer-implemented method and system for providing online language instruction to a student. A student client computer logs into a host system to commence an instruction session. The host assigns an instructor to the instruction session. A scene is simultaneously displayed on a student client computer and a client computer operated by the assigned instructor. A voice communication link is also provided. A predetermined lesson plan can be executed during the instruction session. The lesson plan can be selected according to a student profile stored on the host system. Study goals can also be listed on the computer operated by the instructor. Completion of a study goal can also be stored in the student profile. The student profile can be used to determine a next study goal for a particular student. The scene can be an interactive scene manipulated via the student client computer or via the client computer operated by the instructor. In addition, the instructor can assume control of an avatar in the interactive scene and each student can also take control of an avatar in the interactive scene. Language instruction dialog can relate to the manipulation of the avatars.

24 Claims, 3 Drawing Sheets

INTERACTIVE ONLINE LANGUAGE INSTRUCTION

CROSS REFERENCE TO RELATED APPLICATIONS

This application is a continuation-in-part of Ser. No. 09/344,732, filed Jun. 25, 1999, which claims benefit of U.S. provisional application Serial No. 60/116,120, filed Jan. 15, 1999.

BACKGROUND

This invention relates to the field of online language instruction. More specifically it relates to a language instruction method and technique utilizing the simultaneous display of a scene on a student's display screen and an instructor's display screen. A language exercise is conducted based upon an animated or video scene simultaneously displayed to the student and the instructor. The student and the instructor communicate in a predetermined language via an electronic voice medium.

The study of a foreign language is often best facilitated by a student interacting with others in real life scenarios. The real life scenarios have previously been limited to role playing in a classroom or situations taking place in a community which speaks the language being studied. These limitations create unnecessary hardships for the student who only has certain hours available to study.

What is needed is a mechanism to allow a student to engage in real life scenarios in which the student can practice and study the new language, wherein the study can take place during those hours conducive to the student's schedule. The new mechanism should be free from academic calendars and geographic site limitations. Preferably, the study can take place from the convenience of the student's home or workplace. It should include live interaction with an instructor who is well versed in the language being studied and include a vehicle for reenacting real life situations which the student may encounter.

Previously, online language instruction had been limited to a student unilaterally performing learning exercises on a terminal. These previously known online language systems could provide asynchronous learning, but lacked the interaction of one human being with another. This previous model was based on one or more human beings interacting with a machine. What is needed is interaction between humans facilitated by a shared experience via networked or connected computers.

SUMMARY

Accordingly the present invention provides a computer-implemented method and system for providing online language instruction to a student. The method includes logging a student client computer into a host system to commence an instruction session and assigning a human instructor to the instruction session. A scene is simultaneously displayed on a student client computer and a client computer operated by the assigned instructor. A voice communication link is also provided.

In one aspect, a predetermined lesson plan can be executed. The lesson plan can be selected according to a student profile stored on the host system. Study goals can also be listed on the computer operated by the instructor. Completion of a study goal can also be stored in the student profile. The student profile can be used to determine a next study goal for a particular student.

In another aspect, the scene can be an interactive scene. The interactive scene can be manipulated via the student client computer or via the client computer operated by the instructor. In one embodiment, the instructor can assume control of an avatar in the interactive scene. Each student can also take control of an avatar in the interactive scene. Dialog can relate to the manipulation of the avatars.

In another aspect of the invention, a voice communication link is accomplished using a voice over internet protocol system.

In one aspect the network access device can include a computer. The computer communication network can conform to the transmission control protocol/internet protocol and include the internet or an intranet. An intranet can also include a private communications network distributed across multiple geographic sites. Accordingly, WEB interface can be used to access the executable software stored on the server storage medium. In addition, a co-host server can be utilized, accessing a local area network.

This invention can also embody a computer system, a programmed computer, a computer program residing on a computer-readable medium, a computer data signal or a method of interacting with a computer and embodying the concepts described above.

The details of one or more embodiments of the invention are set forth in the accompanying drawings and the description below. Implementations can provide advantages such as the capability to leverage intellectual capital and provide learning modules online. Other features, objects, and advantages of the invention will be apparent from the description, the drawings and the claims.

DETAILED DESCRIPTION

Online interactive language instruction can provide a readily accessed source of language instruction with a human instructor. Language instruction can be accomplished by appointment on a scheduled basis or on demand at a time convenient to a student.

Figure 1:
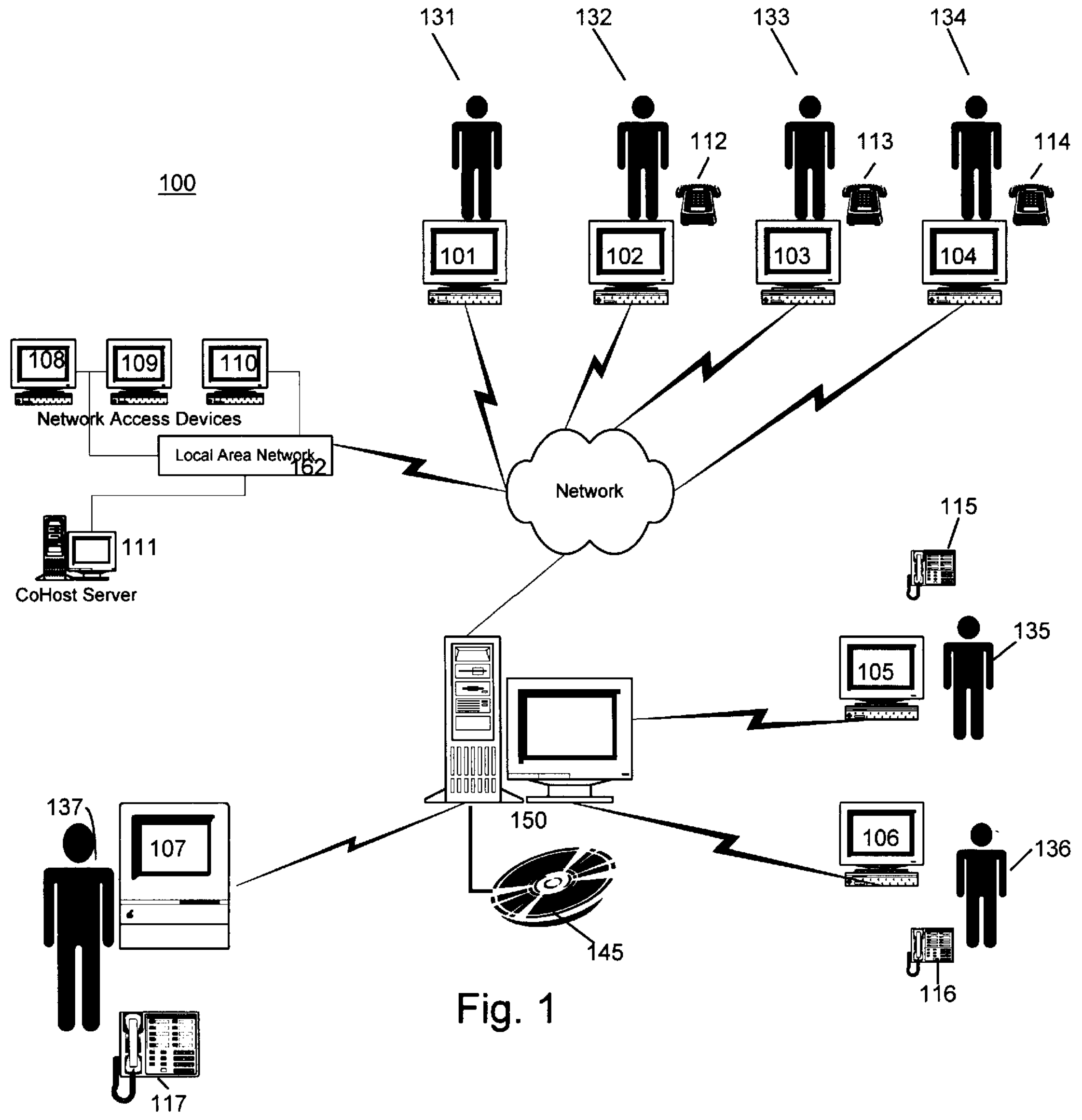
FIG. 1 illustrates the components of an online language instruction system.

FIG. 1 shows a network of computers 100 that may be used in an implementation of an on-line education system. The network 100 includes a host system 150 and client computers 101–110. Each of the client computers includes a processor, memory; a user input device, such as a keyboard and/or mouse, and a user output device, such as a video display and/or printer. The client computers 101–110 can communicate with the host 150 to obtain data stored at the host 150. The client computers 101–110 may interact with the host computer 150 as if the host was a single entity in the network 100. However, the host 150 may include multiple processing and database sub-systems, such as cooperative or redundant processing and/or database servers 111 that can be geographically dispersed throughout the network 100. In some implementations, groups of client computers 108–110 may communicate with host 150 through a local server 111. The local server 111 may be a proxy server or a caching server. Server 107 may also be a co-host server that can serve course content and provide services such as e-mail, chat sessions, conferences, course content, accounting, admissions and login to student's at client computers 104–106.

The host computer 150 includes one or more databases 145 storing course materials. A large variety of course materials may be stored at the host 150; for example, text, audio, video, graphics, animations, and illustrations. In addition, the host 150 may interact with, and gather data from, a student at a student client computer 101–106. Data gathered from the student may be used for on-line testing and assessment. A student can access the host 150 using client software executed at the student's computer 101–106.

An instructor computer 107 can also access the host and the client software such that it can be executed on the instructor's computer 107. The instructor computer 107 can also access the databases 145. In addition, the instructor computer 107 can be programmed to access instructor software code designed to facilitate educational sessions. Instructor software code can, for example, include answers to frequently asked student questions or motivational ideas to stimulate conversation through emulated situations. In addition, instructor software code can include scripts for dialogs to be initiated with a student.

Computers 101–111 and 150 may be connected to each other by one or more network interconnection technologies. For example, dial-up lines, token-ring and/or Ethernet networks 162, T1 lines, asynchronous transfer mode links, wireless links and integrated service digital network (ISDN) Digital Subscriber Lines (DSL), cable modems, wireless connections may all be combined in the network 100. Other packet network and point-to-point interconnection technologies may also be used. Additionally, the functions associated with separate processing and database servers in the host 150 may be integrated into a single server system or may be partitioned among servers 111 and database systems that are distributed over a wide geographic area.

The client software may include a generic hypertext markup language (HTML) browser, such as Netscape Navigator or Microsoft Internet Explorer 5.0 (a "WEB browser"), an HTML program, such as a dot, or any other interface software facilitating user interaction with a client computer. The client software may also be a proprietary browser and/or other host access software. In some cases, an executable program, such as a Java™ program, may be downloaded from the host 150 to the client computer and executed at the client computer as part of the on-line course.

In general, the host computer 150 and the instructor computer 107 will control a teaching process accessible by a student.

Referring now again to FIG. 1, a student 131–136 can log onto a host computer 150 and engage the databases 145 storing course materials. Login can act to request interaction with an instructor 137 wherein the instructor 137 is proficient in a language the student 131–136 wishes to study. A student profile, stored on the host computer 150, can be accessed to reference the language a student is studying and an appropriate level of language skill to be engaged in, specific to the student. An appropriate instructor can be assigned according to the language selected and the level of instruction desired. A voice link 112–116 can be implemented via known technologies including standard telephony or internet voice capability.

A scene depicting a situation, such as those a student may encounter in real life, can be displayed on the client computer of a student 101–106. The same scene can be simultaneously displayed on the client computer of an instructor 107. In one embodiment, the scene can be an interactive scene whereby the student and/or the teacher can manipulate a next action to take place in the scene. Instructional conversation between a teacher and a student can center on the shared experience being portrayed on the client computers 101–110. Typically, the instructional conversation will be conducted in the language being taught wherein the conversation cues off of the scene being depicted.

As the scene is simultaneously displayed on the instructor's client computer 107 and a student's client computer 101–106, the student and teacher engage in conversation using the language being studied. The conversation corresponds to vicarious role playing as the teacher 137 and one or more students 131–136 assume a role corresponding to a character in the scene. In one embodiment, the teacher 137 can have a list of study aids displayed. Study aids can include conversation topics, new vocabulary to be introduced into a conversation, new artifacts to be introduced into the scene or any other programmable entity that may aid in the instruction. Study aids can also facilitate the teacher in initiating new avenues of conversation based upon the scene being displayed. In addition, the teacher 137 can also have presented on its client workstation 107 a list of study goals, vocabulary words, sentence structures, or other educational priorities. The teacher 137 can target the study goals during a particular study session. Successful completion of a study goal by a particular student can be stored in the student profile. The student profile can be accessed to determine an appropriate next study goal for a particular student.

Students 131–136 can interact with a teacher 137 individually such as 135 and 136 or as a group 131–134. In the case of a group 131–134 each of the client computers 101–144 associated with the group will simultaneously display the scene being displayed on the respective computers.

Each student 131–136 must also have the ability to converse with the teacher 137. An audio, or voice communication can take place over a voice link 112–117, such as standard telephone or through audio capability built into the client computers 101–110 and the host computer 150 operating on a network 100. Voice over Internet Protocol systems are well known to those schooled in that art and can be utilized to facilitate convenient audio communication. In one embodiment, an instructor 137 has the ability to direct proctor which student speaks at any given time. This proctoring capability allows the teacher to insure adequate participation by all the students 131–136. It can also be used control a situation wherein one or more students 131–136 who speak the loudest, or the most frequently, would otherwise monopolize a study session.

Figure 2:
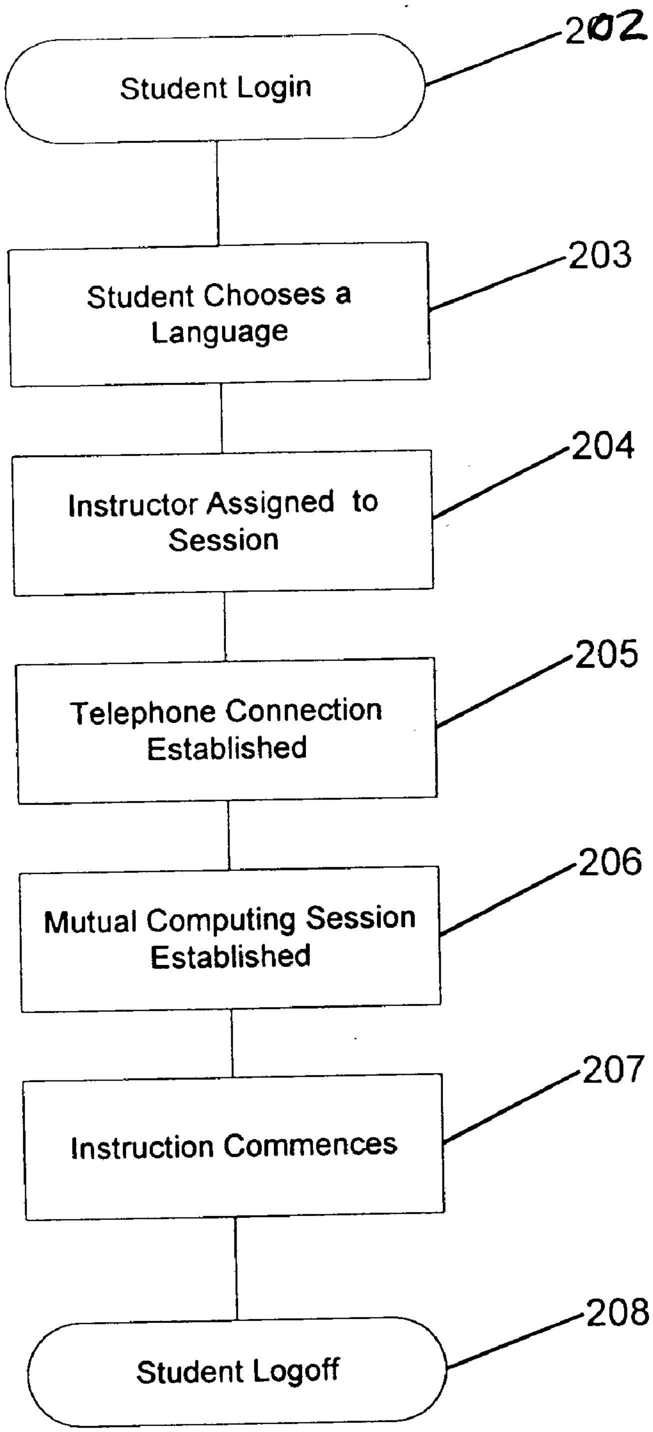
FIG. 2 is a block diagram of steps used to facilitate online language instruction.

Referring now to FIG. 2, a flow chart of steps typically taken to commence a study session is illustrated. To begin, a student can log into the host computer 150 with a student client computer 101–106. Software operative on the host computer 150 can display on the student client computer 101–106 a login screen that allows the student to identify themselves as a student 202. After logging in, a student can choose a language that the student desires to study 203. Login can act as a request for an appropriate instructor.

After the student chooses a language 203, the host computer can assign an instructor to that study session 204. The instructor should be proficient in the language the student wishes to study. If audio capability is not available through the client computers 101–110 and the network 100, such as, for example, using voice over internet protocol, a telephone connection or other communications means can be established 205.

Login and instructor assignment can also cause a mutual computing session to be established 206. The mutual computing session provides for the simultaneous display on a student client computer 101–106 and the instructor's client computer 107 of a scenario corresponding with a lesson to be studied during that study session.

Instruction commences 207 as the student 131–136 and the instructor 137 interact via the established connection. Interaction relates to a scene being displayed on the client computers 101–110. Upon fulfillment of the study session, the student can log off 208. After the student has logged off, the instructor 137 can be reallocated to a new student or group of students.

Figure 3:
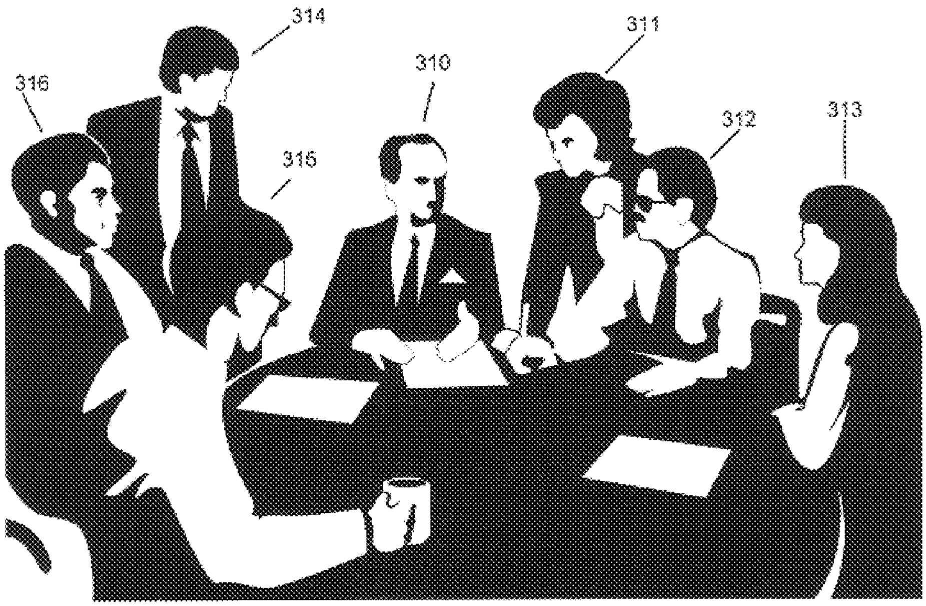
FIG. 3 illustrates an exemplary scene for multiple participants in an online learning session.

Referring now to FIG. 3, a scene to be simultaneously displayed on the student client computers 101–106 and the instructor client computer 107 can include multiple characters 310–316. The instructor 137 and the students 131–136 can each assume a role to play based upon one of the characters 310–316 in the scene 300. For example, an instructor 137 may assume the role of one participant in a business meeting such as first character 310. One or more students 131–136 can individually assume the role of a remaining character 311–316.

Program code on the host computer can cause a scene to progress. An instructor 137 and the students 131–136 engage in conversation relating to the progressing scene speaking the language to be studied. The conversation can relate to the scene being displayed. For example, a conversation can relate to a business meeting 300.

Figure 4:
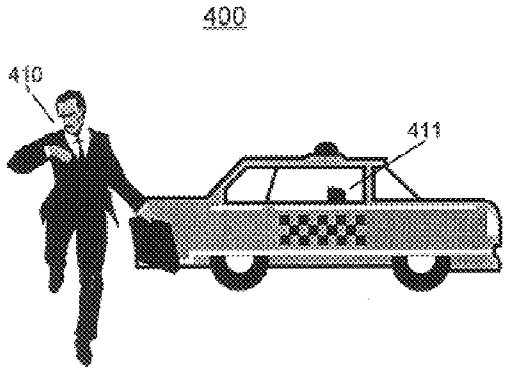
FIG. 4 illustrates an exemplary scene for a single student in an online learning session.

Referring now to FIG. 4, in another embodiment, a student can play a sole character 410 and speak in a monologue wherein the students 131–136 conversation relates to the scene taking place on the workstation computer 101–106. The monologue scene 400 can also include props such as a taxi 411 to help introduce new vocabulary. The instructor 137 can monitor the student's monologue and tutor as necessary.

Figure 5:
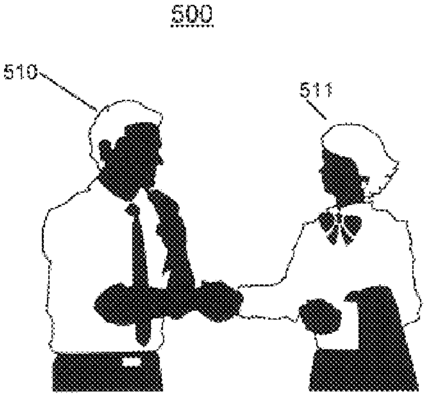
FIG. 5 illustrates an exemplary scene for a single student and an instructor in an online learning session.

Referring now to FIG. 5, in another embodiment, an instructor 137 and a student 131–136 engage in one on one conversation. A one on one scenario 500 can also involve role playing by emulating a set of circumstances the student may encounter. For example, the instructor 137 may role-play one of the characters 511 while the student 131–136 role-plays another character 510. The scene displayed can depict an introduction and meeting. The conversation that ensues can be prompted by either the student 131–136 or the instructor 137. In addition, the instructor 137 can also read from a script supplied via the instructor's workstation computer 107. These scripts can insure a smooth flow to the study session.

Simulations displayed on the workstation computers 101–107 can be as simple as a hotel check in scene or as involved as an entire virtual city. The characters can be lifelike such as in video clips or more animated. In some instances, the more animated figures can allow for greater interaction. The use of animated figures in computer simulations is well known. However, the linking of animated figures to an online interactive language study session is unique. More advanced students can be allowed free reign over an entire virtual city and allow the student to engage in those types of activities they deem important.

In one preferred embodiment, a student 131–136 and an instructor 137 each select an avatar as they commence a new study session. The avatars are displayed on the workstation computers 101–107. The avatars can be manipulated through standard computer input devices including a keyboard, a pointing device such as a mouse or a joystick, a touch pad, or any other input device commonly used with computers. The input devices can control the action being displayed on the computers 101–107, while the instructor 137 and the students 131–136 engage in conversation appropriate to the scene displayed.

In another embodiment, one or more students 131–136 engage in study sessions without the participation of an instructor 137. The instructorless sessions can be less structured and yet provide good practice to the students 131–136.

The invention may be implemented in digital electronic circuitry, or in computer hardware, firmware, software, or in combinations of them. Apparatus of the invention may be implemented in a computer program product tangibly embodied in a machine-readable storage device for execution by a programmable processor; and method steps of the invention may be performed by a programmable processor executing a program of instructions to perform functions of the invention by operating on input data and generating output.

The course content for delivery over the WEB can be developed in conjunction with qualified learning institutions. An institution can provide professors or other institution affiliates to act as consultants in developing course content. In addition the professors can create video clips, audio clips, simulations, animated concepts, multimedia presentations and passive illustrations to be used during the instructional sessions.

The invention may advantageously be implemented in one or more computer programs that are executable on a programmable system including at least one programmable processor coupled to receive data and instructions from, and to transmit data and instructions to, a data storage system, at least one input device, and at least one output device. Each computer program may be implemented in a high-level procedural or object-oriented programming language, or in assembly or machine language if desired; and in any case, the language may be a compiled or interpreted language. Suitable processors include, by way of example, both general and special purpose microprocessors.

A number of embodiments of the present invention have been described. Nevertheless, it will be understood that various modifications may be made without departing from the spirit and scope of the invention. For example, client computers 101–110 can comprise a personal computer executing an operating system such as Microsoft Windows™, Linux™, Unix™, or Apple MacOS™, as well as software applications, such as a web browser. A client computer 101–107 can also be any network access device or a palm-type computer WEB access device that adheres to a point-to-point or network communication protocol such as the Internet protocol. Other examples can include TV WEB browsers, terminals, and wireless access devices (such as a 3-Com Palm VII organizer). A client computer may include a processor, RAM and/or ROM memory, a display capability, an input device and hard disk or other relatively permanent storage. Accordingly, other embodiments are within the scope of the following claims.

What is claimed is:

1. A computer-implemented method for providing online language instruction to a student, the method comprising:

logging a student client computer into a host system to commence an instruction session; assigning an instructor to the instruction session;

displaying a scene simultaneously on the student client computer and a client computer operated by the assigned instructor, said scene having a plurality of characters;

assigning one of said plurality of characters to each of said student and instructor;

implementing a voice communication link, and engaging the student and instructor in language instruction correlating to activities of at least one of said plurality of characters.

2. The method of claim 1 additionally comprising the step of executing a predetermined lesson plan.

3. The method of claim 2 wherein the lesson plan is selected according to a student profile stored on the host system.

4. The method of claim 1 wherein the scene is an interactive scene allowing manipulation of the scene by both the instructor and the student.

5. The method of claim 4 additionally comprising the step of manipulating the scene via an input device associated with the student client computer.

6. The method of claim 4 additionally comprising the step of manipulating the scene via an input device associated with the client computer operated by the instructor.

7. The method of claim 1 additionally comprising the step of initiating language instruction relating to the scene simultaneously displayed on the student client computer and the computer operated by the instructor.

8. The method of claim 1 wherein providing a voice communication link is accomplished using a voice over internet protocol.

9. The method of claim 1 additionally comprising the step of listing study aids on the computer operated by the instructor.

10. The method of claim 1 additionally comprising the step of listing study goals on the computer operated by the instructor.

11. The method of claim 10 additionally comprising the step of storing in a student profile completion of a study goal by a particular student.

12. The method of claim 11 additionally comprising the step of accessing the student profile to determine a study goal for a particular student.

13. A computer communications system for managing online instruction language, the system comprising:

a computer communications server accessible with a network access device via a computer communications network;

a database containing student profiles; and executable software stored on the server which is executable on demand via a student network access device, the software operative with the server to:

assign an instructor to an instructional session responsive to criteria in the student profile;

cause a scene to simultaneously display on the student network access device and an instructor network access device, said scene having a plurality of characters; and cause at least one of said plurality of characters of the scene to be manipulated responsive to input from a network access device.

14. The computer communications system of claim 13 wherein the criteria in the student profile comprises a desired language and skill level.

15. The computer communications system of claim 13 wherein the network access device comprises a computer.

16. The computer communications system of claim 13 wherein the computer communication network conforms to the transmission control protocol/internet protocol.

17. The computer communications system of claim 13 wherein the computer communication network comprises a private network.

18. The computer communications system of claim 13 additionally comprising a WEB interface for accessing the executable software stored on the server storage medium.

19. Computer executable program code residing on a computer-readable medium, the program code comprising instructions for causing the computer to:

log a student client computer into a host system to commence an instruction session;

assign an instructor to the instruction session;

display a scene simultaneously on the student client computer and a client computer operated by the assigned instructor, said scene having a plurality of characters;

assigning one of said plurality of characters to each of said student and instructor;

implement a voice communication link, and engage the student and instructor in language instruction correlating to activities of at least one of said plurality of characters.

20. The computer executable program of claim 19 wherein the program code additionally causes the computer to execute a lesson plan according to a student profile stored on the host system.

21. The computer executable program of claim 19 wherein the computer communications network is a Transmission Control Protocol/Internet Protocol network.

22. A computer data signal embodied in a digital data stream comprising data including online language instruction, wherein the computer data signal is generated by a method comprising the steps of:

logging a student client computer into a host system to commence an instruction session;

assigning an instructor to the instruction session;

displaying a scene simultaneously on the student client computer and a client computer operated by the assigned instructor, said scene having a plurality of characters;

assigning one of said plurality of characters to each of said student and instructor;

implementing a voice communication link, and engaging the student and instructor in language instruction correlating to activities of at least one of said plurality of characters.

23. A computer data signal as in claim 22 wherein the signal generated adheres to the transmission control protocol/internet protocol.

24. A computer-implemented method for providing online language instruction to a student, the method comprising:

logging a student client computer into a host system to commence an instruction session; assigning an instructor to the instruction session;

displaying a scene simultaneously on the student client computer and a client computer operated by the assigned instructor, said scene having at least one character;

assigning said at least one character to said student;

implementing a voice communication link, and engaging the student and instructor in language instruction correlating to activities of said at least one character.

* * * * *